United States Patent
Tamai et al.

(10) Patent No.: US 7,637,846 B2
(45) Date of Patent: Dec. 29, 2009

(54) METHOD AND APPARATUS FOR CONTROL OF TRANSMISSION SHIFTING

(75) Inventors: Goro Tamai, West Bloomfield, MI (US); Birendra P. Bhattarai, Novi, MI (US); William L. Aldrich, III, Davisburg, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 359 days.

(21) Appl. No.: 11/625,901

(22) Filed: Jan. 23, 2007

(65) Prior Publication Data

US 2008/0176708 A1 Jul. 24, 2008

(51) Int. Cl.
- H02P 17/00 (2006.01)
- F16H 61/40 (2006.01)
- B60W 10/04 (2006.01)
- B60W 10/10 (2006.01)
- G06F 19/00 (2006.01)
- G06F 7/00 (2006.01)
- G06F 17/00 (2006.01)

(52) U.S. Cl. .................. 477/110; 477/906; 477/15; 477/68; 701/62; 701/54; 903/903; 903/945

(58) Field of Classification Search .......... 477/15, 477/68, 110, 120, 125, 906; 701/53, 56, 701/62; 903/903, 945
See application file for complete search history.

(56) References Cited

U.S. PATENT DOCUMENTS

| | | | | |
|---|---|---|---|---|
| 5,233,530 | A * | 8/1993 | Shimada et al. | 701/107 |
| 5,829,544 | A * | 11/1998 | Ishizu | 180/197 |
| 5,923,093 | A * | 7/1999 | Tabata et al. | 290/40 C |
| 6,626,797 | B2 * | 9/2003 | Shiiba et al. | 477/97 |
| 6,817,328 | B2 * | 11/2004 | Buglione et al. | 123/179.25 |
| 7,102,313 | B2 * | 9/2006 | Kadota et al. | 318/465 |
| 7,415,342 | B2 * | 8/2008 | Tamai et al. | 701/93 |

* cited by examiner

Primary Examiner—Tisha D Lewis

(57) ABSTRACT

A method and system to control transmission shifting in a motor vehicle having an automatic transmission is provided, wherein a command for a transmission up-shift is detected, and, inhibited, based upon operator input, engine speed, and vehicle operating conditions. A fuel cutoff event is immediately implemented, along with electrical energy regeneration using vehicle kinetic energy. Operator input includes monitoring accelerator pedal input, and inhibiting the command for the transmission up-shift when a tip-out event occurs. The command for inhibiting the transmission up-shift is discontinued when an accelerator pedal tip-in is detected, or accelerator pedal position is greater than a calibrated value, or when engine output torque exceeds a torque threshold, or when engine speed exceeds a speed threshold.

22 Claims, 2 Drawing Sheets

METHOD AND APPARATUS FOR CONTROL OF TRANSMISSION SHIFTING

TECHNICAL FIELD

This invention pertains generally to vehicle transmissions, and more specifically to shifting an automatic transmission.

BACKGROUND OF THE INVENTION

Vehicles equipped with internal combustion engines and automatic transmissions are calibrated to shift transmission gears during ongoing operation based upon predetermined criteria. Shifting between gear ratios in an automatic transmission is driven by operator demand for power, typically as an input to an accelerator pedal and an engine throttle device. In one maneuver, referred to as a tip-out-up-shift, a typical transmission executes an up-shift event, i.e. shifting from a lower gear to a higher gear, when the operator releases or 'tips out' of the accelerator pedal, leading to a closing of the throttle device.

In a hybrid vehicle or a conventional powertrain vehicle which has been calibrated for optimal fuel economy, the control system often cuts fuel when the operator tips out of the accelerator pedal, especially when the accelerator pedal returns to a neutral position. The control system attempts to cut fuel delivery as quickly as possible to achieve a maximum fuel economy benefit. On hybrid systems employing regenerative braking, there is a further desire to ramp in such action as quickly and deeply as possible, while still meeting vehicle driveability requirements.

In a vehicle equipped with a step-automatic transmission, when the operator tips out the accelerator pedal from point A to B (shown in FIG. 1) the exemplary transmission performs a tip-out up-shift as the pedal position transitions across a 3-4 up-shift line, shown as AD. Thus, for a deceleration from operating point A having a vehicle speed of about 105 kilometers per hour ('kph') and an accelerator pedal position starting at about 50% and going to near 0%, the following undesirable actions can occur. The action of tipping out of the accelerator pedal as described causes the transmission to begin to execute a shift-up, and set a shift-in-progress flag. Any scheduled cut in fueling is suspended while the shift-in-progress flag is set, thus delaying start of any deceleration-induced fuel cut. Activation and slewing of regenerative braking is reduced during the shift, thus reducing ability to recapture energy. There is also a tip-out up-shift driveline disturbance. After the shift is complete, fuel cutoff (FCO) is entered. Though the individual driveline disturbances of the up-shift and fuel cutoff entries may be small, the successive events can have a noticeable compounding effect. When the operator brakes the vehicle, a 4-3 downshift (i.e., from fourth gear to third gear) occurs, shown as line BC, resulting in another driveline disturbance. During the 4-3 downshift, regenerative braking is reduced to minimize driveline disturbances. Once the transmission is in third gear, regenerative braking is slewed back in to continue FCO. Furthermore, inhibiting the 3-4 tip-out up-shift results in greater engine speed, resulting in higher regenerative braking power and ability to recapture vehicle kinetic energy.

It is desirable to have a vehicle control system which is able to take more complete advantage of benefits derived from cutting off of fuel and regenerative braking during vehicle deceleration events.

Therefore, a method and system are offered which address the above-stated concerns and permits the vehicle to take more complete advantage of benefits achievable during vehicle deceleration.

SUMMARY OF THE INVENTION

The invention comprises a method and system to inhibit or override a commanded up-shift that is executed in a transmission control system, referred to as tip-out up-shift inhibit. The tip-out up-shift inhibit control system provides benefits, including reducing quantity of downshifting events occurring during vehicle coasting, permitting faster entry into fuel cut-off mode, permitting more complete capture of energy during regenerative braking, and reducing driveline disturbances.

In order to achieve the object of this invention, a method and an article of manufacture are provided that are operable to control transmission shifting in a vehicle having an internal combustion engine operably connected to an automatic transmission operably connected to a vehicle driveline. The vehicle system is preferably operable to regenerate electrical energy in an electrical energy storage system by transforming vehicle kinetic energy. Transmission shifting is controlled using a predetermined gear shifting pattern. The method comprises detecting a command for a transmission up-shift, and, inhibiting the command for the transmission up-shift, based upon operator input, engine speed, and vehicle operating conditions. A fuel cutoff event is immediately implemented in the internal combustion engine, and regeneration of a vehicle electrical energy storage device using vehicle kinetic energy occurs when the command for the transmission up-shift is inhibited. The operator input includes monitoring input to an accelerator pedal, and inhibiting the command for the transmission up-shift when a tip-out event occurs. This includes the operator input to the accelerator pedal being less than a first threshold value, and, the engine speed is below a second threshold value, and vehicle speed being below a shift threshold value. Inhibiting the command for the transmission up-shift occurs only when elapsed time since a preceding up-shift-inhibit command exceeds a threshold time.

Another aspect of the invention includes discontinuing the command for inhibiting the transmission up-shift when an accelerator pedal tip-in from a substantially nil accelerator pedal position is detected, or accelerator pedal position is greater than a calibrated value, or when engine output torque exceeds a torque threshold, or when engine speed exceeds a speed threshold.

Another aspect of the invention includes a method and system to optimize fuel economy of the vehicle having an internal combustion engine operably connected to an automatic transmission operably connected to a vehicle driveline, wherein shifting of the automatic transmission is controlled using a predetermined gear shifting pattern. This includes monitoring operator demand for vehicle propulsion, detecting a command for an up-shift of the automatic transmission, and inhibiting the command for the up-shift based upon the operator demand for vehicle propulsion. The method and control system are then operable to implement fuel cutoff in the internal combustion engine and convert vehicle kinetic energy into electrical energy potential. The exemplary internal combustion engine includes a bi-directional accessory drive device operably coupled to an electrical machine operable to generate electrical energy for storage in an electrical energy storage device. The system is operable to regenerate the electrical energy storage device using vehicle kinetic energy transmitted from the vehicle driveline to the electrical energy storage device when the command for the transmission up-shift is inhibited.

These and other aspects of the invention will become apparent to those skilled in the art upon reading and understanding the following detailed description of the embodiments.

BRIEF DESCRIPTION OF THE DRAWINGS

The invention may take physical form in certain parts and arrangement of parts, the preferred embodiment of which will be described in detail and illustrated in the accompanying drawings which form a part hereof, and wherein.

DETAILED DESCRIPTION OF THE PREFERRED EMBODIMENT

Figure 1:
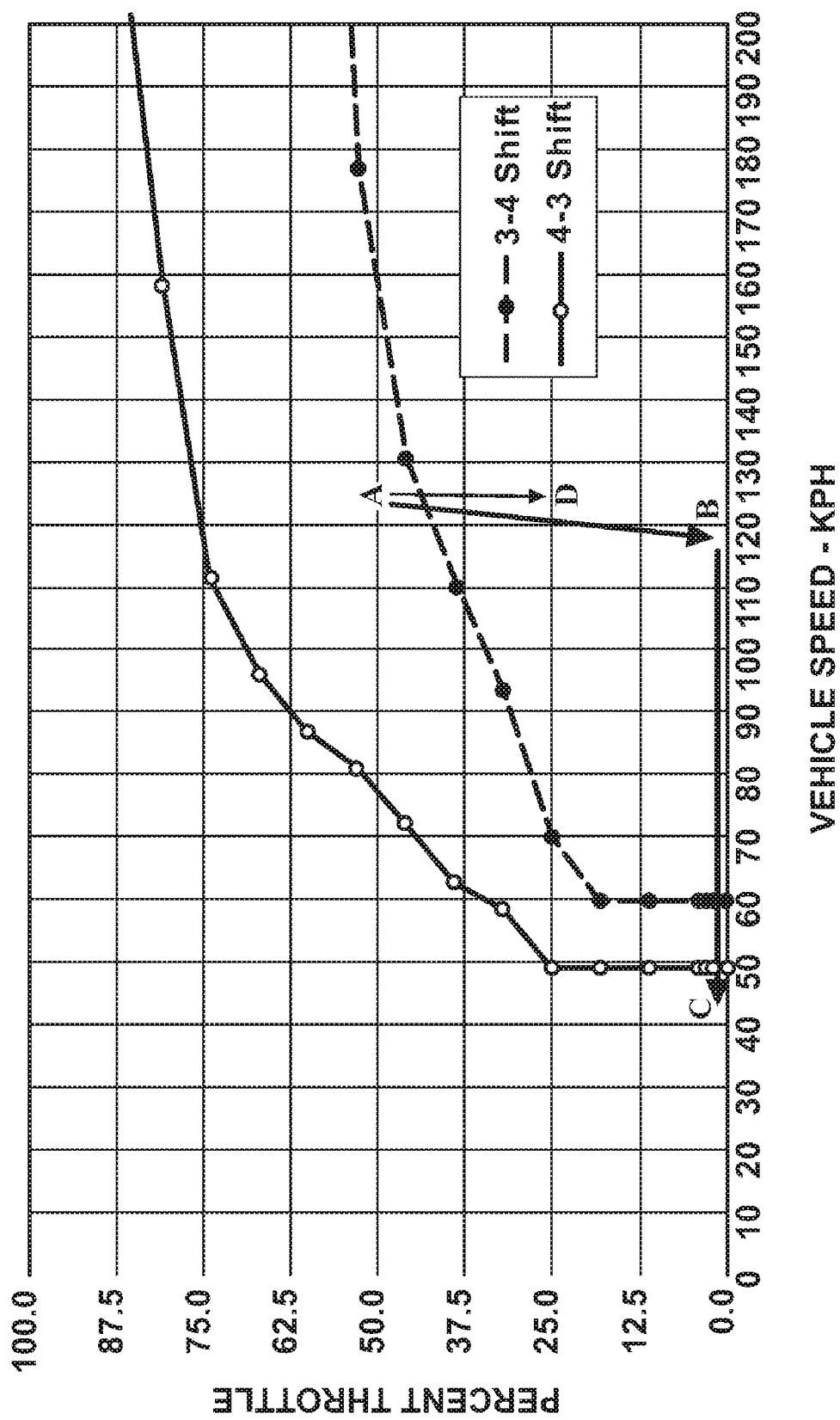
FIG. 1 is an exemplary data graph, in accordance with the present invention; and, FIG. 2 is a schematic diagram of an engine and control system, in accordance with the present invention.
Figure 2:
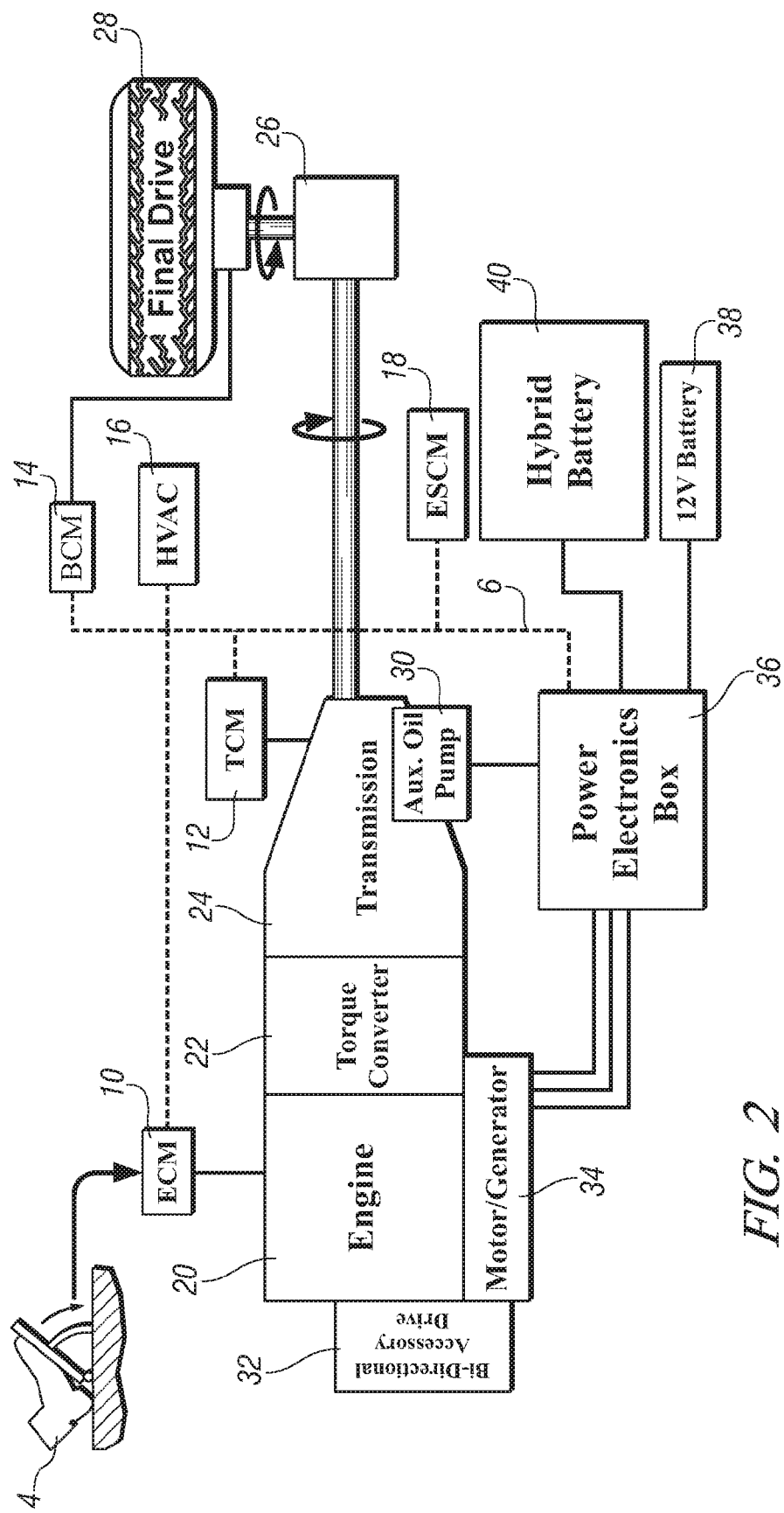

Referring now to the drawings, wherein the showings are for the purpose of illustrating the invention only and not for the purpose of limiting the same, FIG. 2 shows a schematic drawing of a vehicle propulsion system including an exemplary internal combustion engine and control system which has been constructed in accordance with an embodiment of the present invention. The exemplary system, described as a belt-driven alternator/starter ('BAS') system, comprises a powertrain system having internal combustion engine 20, a transmission 24, a motor-generator unit 34, and a Power Electronics Box ('PEB') 36, each signally and/or operably connected to a distributed control system via a local area network (LAN) bus 6. The distributed control system comprises an engine control module (ECM) 10, a transmission control module (TCM) 12, a brake control module (BCM) 14, an energy storage control module (ESCM) 18, and a heating-ventilation-air conditioning controller (HVAC) 16, among others.

The powertrain system includes the internal combustion engine 20 operable to provide tractive power to drive wheels 28 using known power transmission devices including a torque converter 22, transmission 24, and a vehicle driveline 26, typically comprising a transaxle for a front wheel drive vehicle, or, alternatively, a rear differential unit for a rear wheel drive vehicle, or other known devices for delivering power to vehicle wheels. Alternatively, the vehicle is operable to transmit kinetic energy to the vehicle driven wheels 28, through vehicle driveline 26 to the transmission 24 torque-converter 22, and engine to a bi-directional accessory belt drive system 32 and motor-generator unit 34.

The motor-generator unit ('MGU') 34 comprises an electrical machine operable to act as a torque-generative device and as an electrical-generative device, preferably depending upon vehicle operation and a control signal from the controller 10 to the Power Electronics Box ('PEB') 36, and other control signals. The PEB 36 includes the functions of a Power Inverter Module (PIM) and Auxiliary Power Module (APM) to selectively transmit electrical energy between the MGU 34 and a high-voltage ('HV') battery 40, preferably operating at 36 $V_{DC}$, (also nominally referred to as a '42-Volt system') and a conventional twelve-volt battery 38. The PEB is operable to control operation of an electrically-powered auxiliary oil pump 30 fluidly attached to a hydraulic circuit of the transmission 24 to provide pressurized fluid in the hydraulic circuit during specific operating conditions, including engine shutdown and vehicle shutdown. It is understood that the voltage battery 40 and the conventional twelve-volt battery 38 can comprise any one of various devices operable to provide electrical energy storage capacity on the vehicle.

The internal combustion engine 20 is operably attached to the bi-directional accessory belt drive system 32 intended to operate in a first operating condition, comprising an electrical energy generating mode and in a second operating condition, comprising a torque-generating mode. In the first operating mode, the internal combustion engine 20 provides torque to the accessory belt drive system 32, transferring power and energy to motor-generator unit 34 ('MGU') and other accessories. In the first operation the MGU 34 functions as the electrical energy generative device to replenish or charge the electrical energy storage system comprising the HV battery 40 and the twelve-volt battery 38, using torque generated by the engine 20 and/or kinetic energy from the vehicle. In the second operating condition, the MGU 34 functions as an electrical motor to generate torque which is transmitted to the internal combustion engine 20 via the accessory belt drive system 32 to start engine operation, using electrical energy stored in the electrical energy storage system. The MGU 34 can further function as the electrical motor to generate torque that is transmitted to the engine 20 to stabilize engine operation and provide torque damping to the vehicle driveline.

The aforementioned componentry of the exemplary embodiment is known to a skilled practitioner, although it is understood that alternate embodiments using novel componentry may fall within the scope of the invention described herein.

The distributed control system comprising an integrated vehicle control system wherein the controllers, including ECM 10, TCM 12, BCM 14, and HVAC 16 are signally connected via LAN 6 to accomplish various tasks. Each of the aforementioned control processors is preferably a general-purpose digital computer generally including a microprocessor or central processing unit, ROM, RAM, and I/O including A/D and D/A. Each control processor includes a set of control algorithms, comprising resident program instructions and calibrations stored in ROM and executed to provide the respective functions. Information transfer between the various control processors is preferably accomplished by way of the aforementioned LAN.

The integrated vehicle control system is signally attached to a plurality of sensing devices and operably connected to a plurality of output devices to ongoingly monitor and control operation of the engine 20, the transmission 24, and the MGU 34 and the PEB 36. This includes monitoring conditions of the HV battery 40, and, determining state of charge of the HV battery 40. The controlled output devices preferably include subsystems for proper control and operation of the engine 20, including, by way of example, an air intake system including a throttle control system, a fuel injection system, a spark-ignition system (when a spark-ignition engine is used), an exhaust gas recirculation system, and an evaporative control system. The sensing devices include devices operable to monitor engine operation, including engine speed, and load, comprising manifold pressure and/or airflow. The ECM 10 is preferably operable to regularly determine an engine operating point based upon the monitored engine operation. Other sensors include those operable to monitor external conditions, and operator demand, and are typically signally attached to the ECM 10 via wiring harnesses.

One operator input of significance comprises position of accelerator pedal sensor (APS) 4. Accelerator pedal position comprises a measure of the operator input to the APS 4, typically measured in a range from 0% to 100%. The input signal from the APS 4 is preferably read and interpreted by the ECM 10, and can comprise the pedal position, in percent, an operating band of the pedal position, e.g. 0-5%, 5-10%, 10-15%; and a time-based derivative of the pedal position. Each of the aforementioned pedal position signals is useable by the ECM 10 as an input to control operation of the engine and transmission, including control of tip-out up-shift events.

Control algorithms in each of the control processors are typically executed during preset loop cycles such that each control algorithm is executed at least once each loop cycle. Algorithms stored in the non-volatile memory devices are executed by the respective central processing unit and are operable to monitor inputs from the sensing devices and execute control and diagnostic routines to control operation of the respective device, using preset calibrations. Loop cycles are typically executed each 3.125, 6.25, 12.5, 25 and 100 milliseconds during ongoing engine and vehicle operation. Alternatively, control algorithms may be executed in response to occurrence of an event. A cyclical event, e.g. calculating engine fueling, may be executed each engine cycle. An action to start the engine 20 after it is turned off is preferably executed in response to an event, e.g. an operator demand for acceleration which is detected by monitoring operator input to accelerator pedal 4. Alternatively, the action to start the engine 20 after it is turned off may be a quasi-cyclic event, wherein the powertrain controller 10 cyclically monitors vehicle conditions such ambient air temperature, and implements an engine start event on a subsequent loop cycle in order to provide additional functionality.

The integrated vehicle control system is signally connected to the aforementioned sensors and other sensing devices, and operably connected to output devices to monitor and control engine and vehicle operation. The output devices preferably include subsystems providing for proper control and operation of the vehicle, including the engine, transmission, and brakes. The sensing devices providing signal input to the vehicle include devices operable to monitor vehicle operation, external and ambient conditions, and operator commands.

In overall operation, the ECM sends motor/generators 34 control commands to the PEB 36 in the form to torque, speed, or voltage-control commands, depending on the hybrid function. The PEB broadcasts key control parameters such as motor speed, delivered torque, temperature, and diagnostics. The ESCM 18 monitors key inputs to support hybrid battery (i.e. HV battery 40) state optimization, in addition to supporting automatic fan and disconnect control. The ECM and the TCM interact to coordinate gear-shift and TCC operation to maximize fuel economy and optimize driveability. Each of these control actions are preferably executed while integrating operation of the BCM and the HVAC. Hybrid powertrain operations of the exemplary system preferably include engine start/stop; fuel-cut during vehicle deceleration using the electrical machine 34 to provide smoothing of driveline torque; control of battery charge/discharge; regenerative braking; electrical power assist; and, electrically motored creep.

The exemplary transmission preferably comprises a known automatic transmission having a plurality of gear ratios typically providing transmission input/output speed ratios ranging from about 3/1 to 0.7/1. The transmission control processor preferably includes control algorithms and predetermined calibrations useable to control ongoing operation of the transmission 24, preferably in coordination with other control processors. The transmission calibration preferably includes a predetermined gear shifting pattern which controls gear shifting within the transmission based upon operator torque requests comprising inputs to the accelerator pedal, engine operating speed, and vehicle speed. One such shifting pattern comprises an up-shift, wherein the controller commands the transmission to shift from a lower gear ratio to a higher gear ratio based upon a change in the aforementioned inputs.

The invention includes a method and system to optimize vehicle fuel economy by controlling transmission shifting in the aforementioned system. The method comprises detecting a command for a transmission up-shift, and inhibiting the command for the up-shift, based upon operator input, engine speed, and vehicle operating conditions. The control system implements fuel cutoff in the internal combustion engine and converts vehicle kinetic energy into electrical energy potential in conjunction with the shift inhibition. This operation is now described in detail.

In operation, when the operator changes demand for vehicle propulsion by tipping out of the accelerator pedal 4, from a first pedal position to a second pedal position, the commanded up-shift is inhibited, or overridden, and the transmission is held in the present gear. This override can be achieved by executing a "maxgear" command or setting a "maxgear" flag in the controller. The transmission 'up-shift inhibit' flag is set when all of the following conditions are met:

a. Vehicle speed is below a precalibrated shift line, or on detection of a accelerator pedal tip-out or a constant accelerator pedal position; and, b. An entry-delay timer, $t\_e$, is satisfied, i.e., the 'up-shift inhibit' flag has been clear for a minimum of time $t\_e$ seconds; and, c. the transmission gear is not first gear or a maximum gear; and, d. Accelerator pedal position is below a position threshold, $K1$; and, e. A 'clear-delay' timer, $t\_c$, has been satisfied; and, f. Engine speed is below an engine speed threshold $K2$.

The threshold parameters $K1$, $K2$, $t\_e$, and, $t\_c$ are preferably calibrated separately for each transmission gear, for a specific vehicle/powertrain application.

It is understood that the input from the accelerator pedal 4 comprises one of several inputs that can be used by the ECM 4 to discern and quantify operator input. Other inputs can include input from a cruise control system, and input from an electric throttle control system that can alter vehicle and engine operation to address other concerns, such as cold or hot operation and accessory drive demands.

When the command for the up-shift event is inhibited, a fuel cutoff event ('FCO') can be immediately executed in the internal combustion engine. The FCO event can comprise any one of a number of engine fueling events, from reduced engine fueling to shutting off fuel to the engine, including completely shutting down operation of the engine. Preferable FCO events are based upon specific powertrain and engine architectures and are outside the scope of the invention.

When the command for the transmission up-shift is inhibited, driveline-based electrical regeneration mode is executed by implementing electrical regeneration immediately subsequent to the action of inhibiting the up-shift. This includes ramping up operation of the motor/generator 34. Electrical regeneration comprises using torque generated in the vehicle driveline resulting from vehicle kinetic energy, i.e. forward motion, to generate electrical energy that is storable in the HV battery 40 or the twelve volt battery 38. Capturing vehicle kinetic energy as electrical energy via regeneration can be initiated as a result of the operator accelerator pedal tip-out, or in conjunction with an operator request for vehicle braking.

Driveline-based electrical regeneration, including preferable electrical regeneration operating modes, are based upon specific powertrain and engine architectures, and are outside the scope of the invention.

Once in the transmission 'up-shift inhibit' mode, any of the following events preferably can trigger the TCM 12 to exit the up-shift inhibit mode:

a. A accelerator pedal tip-in, from a substantially neutral, or nil, position, is detected; or, b. The transmission is in the maximum gear, or in first gear; or, c. The acceleration pedal position is greater than a calibrated value, K2, which is paired with K1, above as a hysteresis pair; or, d. A tip-out is not detected and the accelerator pedal position is not neutral, and vehicle speed is greater than the shift line threshold speed plus a predetermined calibration value; or, e. Engine torque exceeds a torque threshold; or, f. Engine speed is greater than an engine speed threshold value, comprising K2 plus K3, comprising a hysteresis engine speed value.

Once the transmission 'up-shift inhibit' flag is cleared, the transmission 'up-shift inhibit' mode can not be re-entered for minimum time, t_e, as above. Similarly, once in transmission 'up-shift inhibit' mode, when the conditions to stay in the mode are not satisfied, the transmission operates in the mode for minimum time, t_c, before the transmission 'up-shift inhibit' flag is cleared, in order to minimize driveline disturbances by staggering tip-in and up-shift events.

Although this is described in context of a vehicle having a BAS hybrid system, it is understood that alternate embodiments of this invention can include other vehicle systems having hybrid and non-hybrid configurations and fixed gear transmissions. Other configurations include systems having alternator/starter systems, such as flywheel-driven alternator/starter systems. This includes vehicle systems operable to translate vehicle kinetic energy to electrical energy potential.

The invention has been described with specific reference to the preferred embodiments and modifications thereto. Further modifications and alterations may occur to others upon reading and understanding the specification. It is intended to include all such modifications and alterations insofar as they come within the scope of the invention.

Having thus described the invention, it is claimed:

1. A method to control transmission shifting in a vehicle having an internal combustion engine operably connected to an automatic transmission operably connected to a vehicle driveline, said shifting controlled using a predetermined gear shifting pattern, comprising:

monitoring an operator input to an accelerator pedal;

detecting a command for a transmission up-shift associated with an operator input to the accelerator pedal comprising a tip-out, inhibiting the command for the transmission up-shift associated with the operator input to the accelerator pedal based upon the tip-out and engine speed and vehicle operating conditions; and implementing a fuel cutoff event in the internal combustion engine when the command for the transmission up-shift is inhibited, wherein implementing a fuel cutoff event comprises shutting off fuel to the engine.

2. The method of claim 1, further comprising: regenerating an electrical energy storage device using vehicle kinetic energy when the command for the transmission up-shift is inhibited.

3. The method of claim 1, wherein inhibiting the command for the transmission up-shift, based upon operator input further comprises:

monitoring operator input to the accelerator pedal; and, inhibiting the command for the transmission up-shift when the operator input to the accelerator pedal is less than a first threshold value.

4. The method of claim 3, wherein inhibiting the command for the transmission up-shift, based upon engine speed further comprises inhibiting the command for the transmission up-shift when the engine speed is below a second threshold value.

5. The method of claim 4, wherein inhibiting the command for the transmission up-shift, based upon vehicle operating conditions further comprises inhibiting the command for the transmission up-shift when vehicle speed is below a shift threshold value.

6. The method of claim 5, wherein inhibiting the command for the transmission up-shift based upon vehicle operating conditions further comprises inhibiting the command for the transmission up-shift when elapsed time since a preceding up-shift inhibit command occurred exceeds a threshold time.

7. The method of claim 1, further comprising: discontinuing inhibiting the command for the transmission up-shift when an accelerator pedal tip-in from a substantially nil accelerator pedal position is detected.

8. The method of claim 1, further comprising: discontinuing inhibiting the command for the transmission up-shift when an accelerator pedal position is greater than a calibrated value.

9. The method of claim 1, further comprising: discontinuing inhibiting the command for the transmission up-shift when engine output torque exceeds a torque threshold.

10. The method of claim 1, further comprising: discontinuing inhibiting the command for the transmission up-shift when the engine speed exceeds a speed threshold.

11. Method to optimize fuel economy of a vehicle having an internal combustion engine operably connected to an automatic transmission operably connected to a vehicle driveline, wherein shifting of the automatic transmission is controlled using a predetermined gear shifting pattern, comprising:

monitoring operator demand for vehicle propulsion;

detecting a command for an up-shift of the automatic transmission associated with the operator demand for vehicle propulsion based upon a tip-out;

inhibiting the command for the up-shift based upon the operator demand for vehicle propulsion based upon the tip-out; and implementing fuel cutoff in the internal combustion engine and converting vehicle kinetic energy into electrical energy potential, wherein implementing a fuel cutoff event comprises shutting off fuel to the engine.

12. Article of manufacture, comprising a storage medium having a computer program encoded therein for effecting a method to control an automatic transmission operably connected to an internal combustion engine of a vehicle, comprising:

code for monitoring an operator input to an accelerator pedal;

code for controlling gear shifting in the transmission based upon a predetermined gear shifting pattern, code for detecting a command for a transmission up-shift associated to the operator input to the accelerator pedal comprising a tip-out;

code for inhibiting the command for the transmission up-shift associated with the operator input to the accelerator pedal based upon the tip-out and engine and vehicle operating conditions; and code for implementing a fuel cutoff event in the engine when the command for the up-shift is inhibited, wherein implementing a fuel cutoff event comprises shutting off fuel to the engine.

13. The article of manufacture of claim 12, further comprising an output of the automatic transmission operably connected to a vehicle driveline; the internal combustion engine further comprising a bi-directional accessory drive device operably coupled to an electrical machine operable to generate electrical energy for storage in an electrical energy storage device.

14. The article of manufacture of claim 12, further comprising: code for regenerating the electrical energy storage device using vehicle kinetic energy transmitted from the vehicle driveline to the electrical energy storage device when the command for the transmission up-shift is inhibited.

15. The article of manufacture of claim 12, wherein code for inhibiting the command for the up-shift, based upon operator input further comprises:

code for monitoring operator input to an accelerator pedal; and, code for inhibiting the command for the up-shift when the operator input to the accelerator pedal is less than a first threshold value.

16. The article of manufacture of claim 15, wherein code for inhibiting the command for the up-shift, based upon engine speed further comprises code for inhibiting the command for the up-shift when the engine speed is below a second threshold value.

17. The article of manufacture of claim 16, wherein code for inhibiting the command for the up-shift, based upon vehicle operating conditions further comprises code for inhibiting the command for the up-shift when vehicle speed is below a shift threshold value.

18. The article of manufacture of claim 17, wherein code for inhibiting the command for the up-shift event based upon vehicle operating conditions further comprises code for inhibiting the command for the up-shift when elapsed time since a preceding up-shift inhibit command occurred exceeds a threshold time.

19. The article of manufacture of claim 12, further comprising: code for discontinuing inhibiting the command for the up-shift when an accelerator pedal tip-in from a substantially nil accelerator pedal position is detected.

20. The article of manufacture of claim 12, further comprising: code for discontinuing inhibiting the command for the up-shift when an accelerator pedal position is greater than a calibrated value.

21. The article of manufacture of claim 12, further comprising: code for discontinuing inhibiting the command for the up-shift when engine output torque exceeds a torque threshold.

22. The article of manufacture of claim 12, further comprising: code for discontinuing inhibiting the command for the up-shift when engine speed exceeds a speed threshold.

\* \* \* \* \*